(12) United States Patent
Yano et al.

(10) Patent No.: US 11,556,785 B2
(45) Date of Patent: Jan. 17, 2023

(54) GENERATION OF EXPANDED TRAINING DATA CONTRIBUTING TO MACHINE LEARNING FOR RELATIONSHIP DATA

(71) Applicant: FUJITSU LIMITED, Kawasaki (JP)

(72) Inventors: Shotaro Yano, Fukuoka (JP); Takuya Nishino, Atsugi (JP); Koji Maruhashi, Hachioji (JP)

(73) Assignee: FUJITSU LIMITED, Kawaski (JP)

( * ) Notice: Subject to any disclaimer, the term of this patent is extended or adjusted under 35 U.S.C. 154(b) by 468 days.

(21) Appl. No.: 16/728,314

(22) Filed: Dec. 27, 2019

(65) Prior Publication Data

US 2020/0257974 A1 Aug. 13, 2020

(30) Foreign Application Priority Data

Jan. 11, 2019 (JP) .............................. JP2019-003474

(51) Int. Cl.
| | |
|---|---|
| *G06N 3/00* | (2006.01) |
| *G06N 3/08* | (2006.01) |
| *G06N 20/10* | (2019.01) |
| *G06F 17/16* | (2006.01) |
| *G06F 17/18* | (2006.01) |
| *G06K 9/62* | (2022.01) |

(52) U.S. Cl.
CPC ............... *G06N 3/08* (2013.01); *G06F 17/16* (2013.01); *G06F 17/18* (2013.01); *G06K 9/628* (2013.01); *G06K 9/6228* (2013.01); *G06K 9/6232* (2013.01); *G06K 9/6256* (2013.01); *G06K 9/6277* (2013.01); *G06N 20/10* (2019.01)

(58) Field of Classification Search
CPC .......... G06N 3/08; G06N 20/10; G06F 17/16; G06F 17/18; G06K 9/6228; G06K 9/6232; G06K 9/6256; G06K 9/6277; G06K 9/628
See application file for complete search history.

(56) References Cited

U.S. PATENT DOCUMENTS

| | | | |
|---|---|---|---|
| 2002/0099675 A1* | 7/2002 | Agrafiotis | G06N 3/02 706/15 |
| 2018/0096247 A1* | 4/2018 | Maruhashi | G06N 3/084 |
| 2018/0114093 A1* | 4/2018 | Hasuko | G06F 17/18 |

FOREIGN PATENT DOCUMENTS

| | | |
|---|---|---|
| JP | 2007-334755 | 12/2007 |
| JP | 2018-055580 | 4/2018 |

OTHER PUBLICATIONS

Koji Maruhashi, "Deep Tensor: Eliciting New Insights from Graph Data that Express Relationships Between People and Things", Fujitsu. 68, 5, pp. 29-35, Sep. 2017.

\* cited by examiner

*Primary Examiner* — Khai M Nguyen
(74) *Attorney, Agent, or Firm* — Staas & Halsey LLP

(57) ABSTRACT

An apparatus identifies partial tensor data that contributes to machine learning using tensor data in a tensor format obtained by transforming training data having a graph structure. Based on the partial tensor data and the training data, the apparatus generates expanded training data to be used in the machine learning by expanding the training data.

8 Claims, 15 Drawing Sheets

FIG. 5

| ACQUISITION TIME (41) | DATA (42) | | | LABEL (43) |
|---|---|---|---|---|
| | COMMUNICATION SOURCE HOST (51) | COMMUNICATION DESTINATION HOST (52) | AMOUNT (53) | |
| 10:00-10:10 | S1 | R1 | 3 | 1.0 |
| | S2 | R1 | 1 | |
| | S1 | R2 | 2 | |
| | ... | ... | ... | |
| | COMMUNICATION SOURCE HOST | COMMUNICATION DESTINATION HOST | AMOUNT | |
| 10:10-10:20 | S2 | R1 | 5 | 0 |
| | S1 | R1 | 3 | |
| | S1 | R2 | 2 | |
| | ... | ... | ... | |
| ... | ... | | | ... |

GENERATION OF EXPANDED TRAINING DATA CONTRIBUTING TO MACHINE LEARNING FOR RELATIONSHIP DATA

CROSS-REFERENCE TO RELATED APPLICATION

This application is based upon and claims the benefit of priority of the prior Japanese Patent Application No. 2019-003474, filed on Jan. 11, 2019, the entire contents of which are incorporated herein by reference.

FIELD

The technique according to the present disclosure relates to generation of expanded data contributing to machine learning for relationship data.

BACKGROUND

Machine learning such as deep learning (DL) or the like using a neural network is used as a technique for classifying relationships between people and things in which data (hereinafter, may be described as relationship data) defined as a set of relationships between people and things (variable values), such as communication logs, bank transaction histories, and the like, is used as an input.

As machine learning, a deep tensor (DT) that learns by inputting relationship data as tensor data is known. A deep tensor is a form of a graph structure learning technique capable of performing deep learning of data of a graph structure, in which a graph structure is used as an input, and the graph structure is handled as tensor data (hereinafter, sometimes described as a tensor). In a deep tensor, a partial structure (partial pattern of a tensor) of a graph contributing to prediction is extracted as a core tensor, whereby highly accurate prediction is realized.

In machine learning including such a DL or the like, abnormal data is likely to be insufficient regardless of the application area. For example, in machine learning for classifying a communication log into an attack log and a normal log, a normal communication log may be easily collected in log collection of daily activities, however, it is difficult to collect a communication log at the time of an attack. For this reason, in machine learning, data expansion is widely used in which expanded training data, which is new training data, is generated from existing training data to facilitate learning.

For example, a technique is known in which a central basic structure is selected from a database of a previously prepared compound, and the compound varieties are generated in the form of adding the accompanying partial structure. A technique is also known for generating new data by randomly changing or adding elements to original data which is a reference.

Japanese Laid-open Patent Publication No. 2018-055580 and Japanese Laid-open Patent Publication No. 2007-334755 are examples of related art.

SUMMARY

According to an aspect of the embodiments, an apparatus identifies partial tensor data that contributes to machine learning using tensor data in a tensor format obtained by transforming training data having a graph structure. Based on the partial tensor data and the training data, the apparatus generates expanded training data to be used in the machine learning by expanding the training data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of information stored in a training data DB;

DESCRIPTION OF EMBODIMENTS

In a case of performing data expansion in relationship data that is a combination of discrete values, it is difficult to determine in advance or afterward whether an appropriate data expansion is performed or not, unlike data expansion performed using common numerical data or image data.

For example, the compound method requires that the basic structure and partial structure be known in advance, so the method may not be applied to data such as relationship data that is not able to express the basic structure or the like explicitly. In a method of changing elements, the number of directions to decrease is limited, however, the number of directions to increase becomes a large number of combinations, and there is a possibility that poor quality data that does not contribute to classification will be generated.

In one aspect, it is desirable to generate expanded training data that contributes to the learning by a deep tensor.

Embodiments of a data expansion program, a data expansion method, and a data expansion device disclosed in the present application will be described in detail with reference to the drawings. The technique according to the present disclosure is not limited by these embodiments. The embodiments may be suitably combined within a range of no contradiction.

First Embodiment

[Description of Data Expansion Device]

Figure 1:
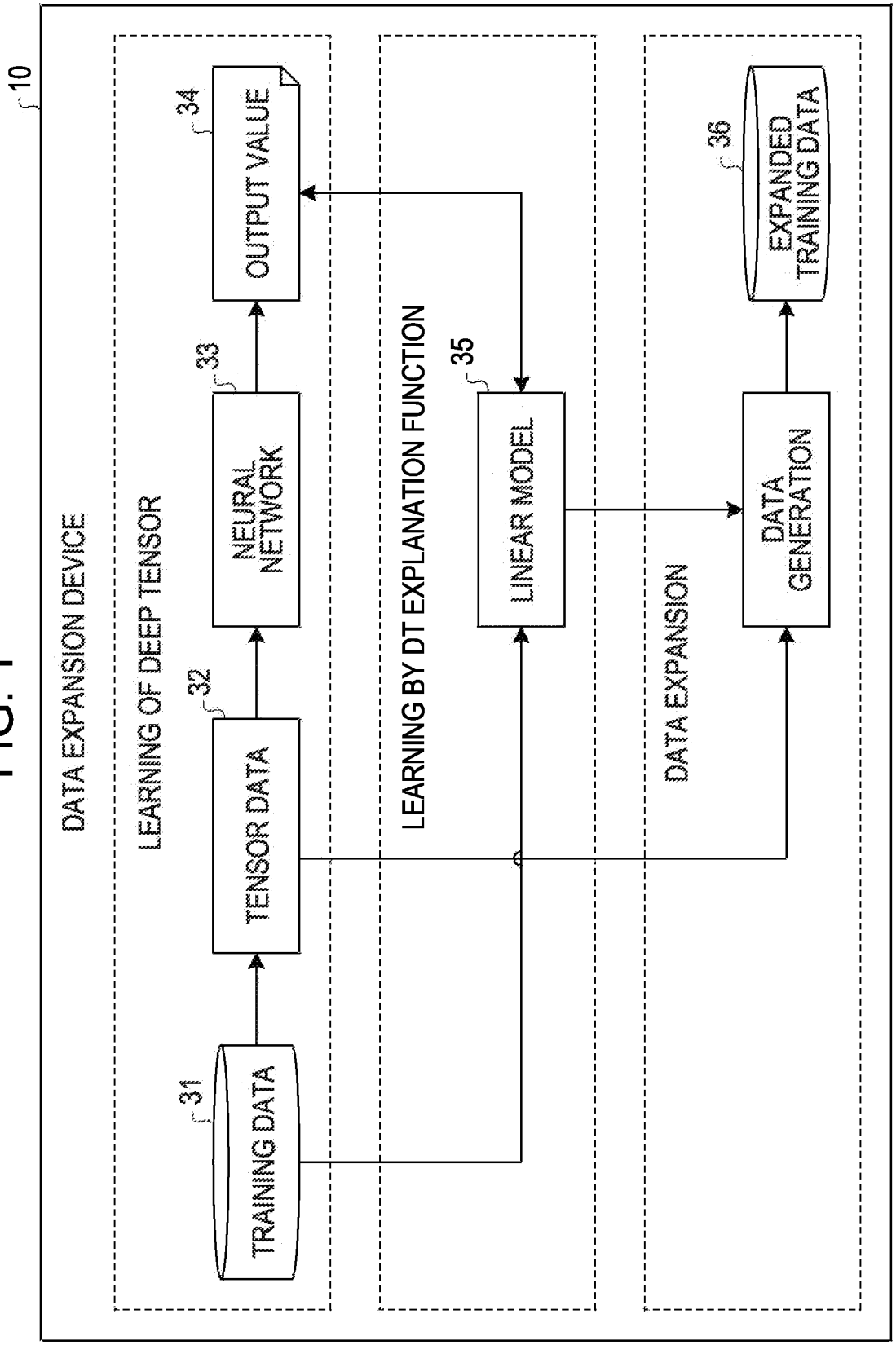
FIG. 1 is a diagram for describing a data expansion device according to a first embodiment.

FIG. 1 is a diagram for describing a data expansion device 10 according to a first embodiment. The data expansion device 10 illustrated in FIG. 1 is an example of a computer device that generates expanded training data 36, which is training data obtained by expanding training data 31 used for learning, using a learning result by a deep tensor by tensor data 32 generated from training data 31. For example, the data expansion device 10 generates an abnormal communication log expanded from an abnormal communication log with a small number of collections as training data for determining whether a normal communication log (a positive example) or an abnormal communication log such as an attack or the like (negative example) is used.

Figure 2:
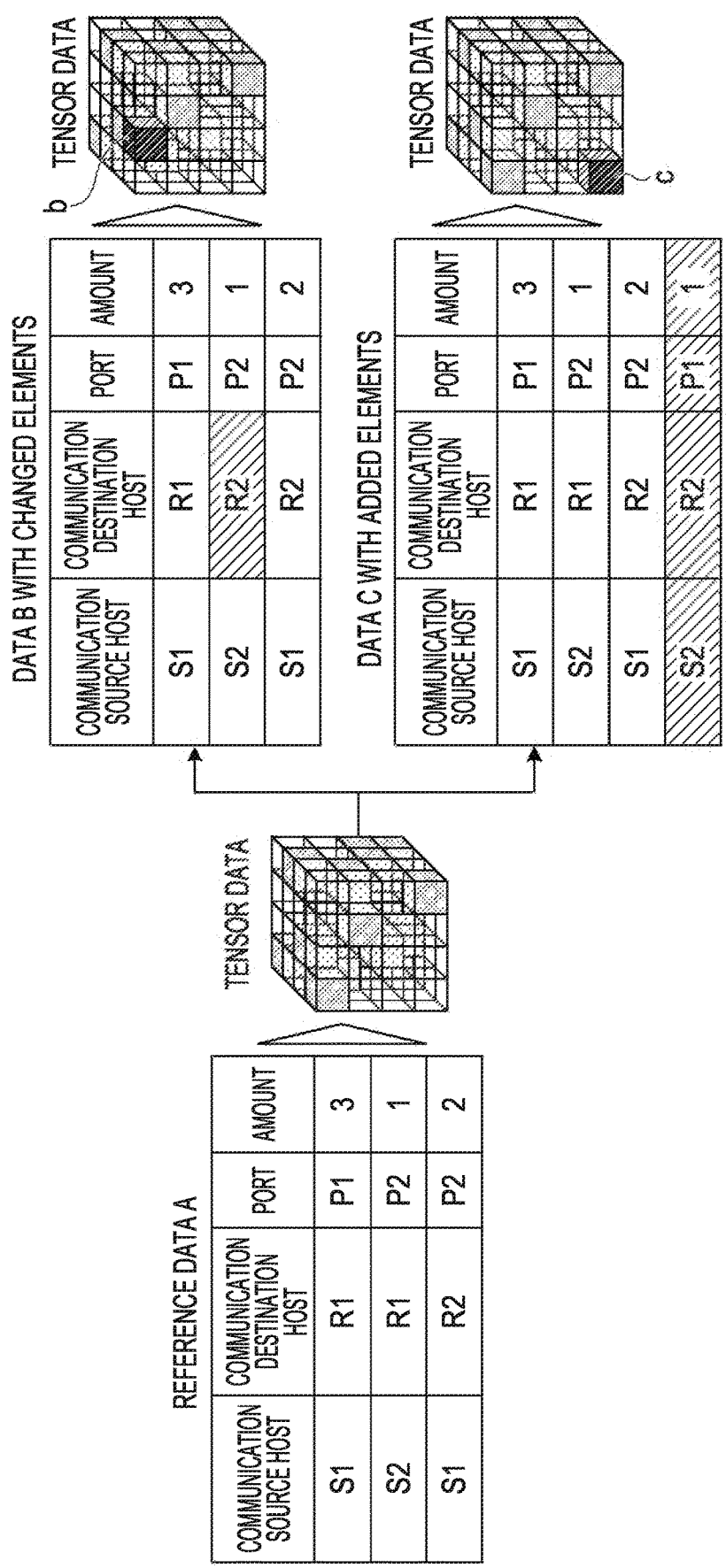
FIG. 2 is a diagram for describing common data expansion.

In common data expansion, generation of new training data is performed by randomly modifying or adding elements to original training data which is a reference. FIG. 2 is a diagram for describing common data expansion. As an example of relationship data that is a combination of discrete values, a communication log configured of "communication source host", "communication destination host", "port", and "amount" will be described as an example. This communication log is a log indicating how many times communication has occurred at which port number from the communication source host to the communication destination host.

As illustrated in FIG. 2, in a common technique, expanded training data B is generated by changing an element R1 to R2 for reference communication data A. When the expanded training data B is converted into a tensor, tensor data in which an element b is changed is generated from a tensor of the reference communication data A. When an expanded training data C is generated by adding a new element, tensor data in which an element c is added is generated from the tensor of the reference communication data A.

Figure 3:
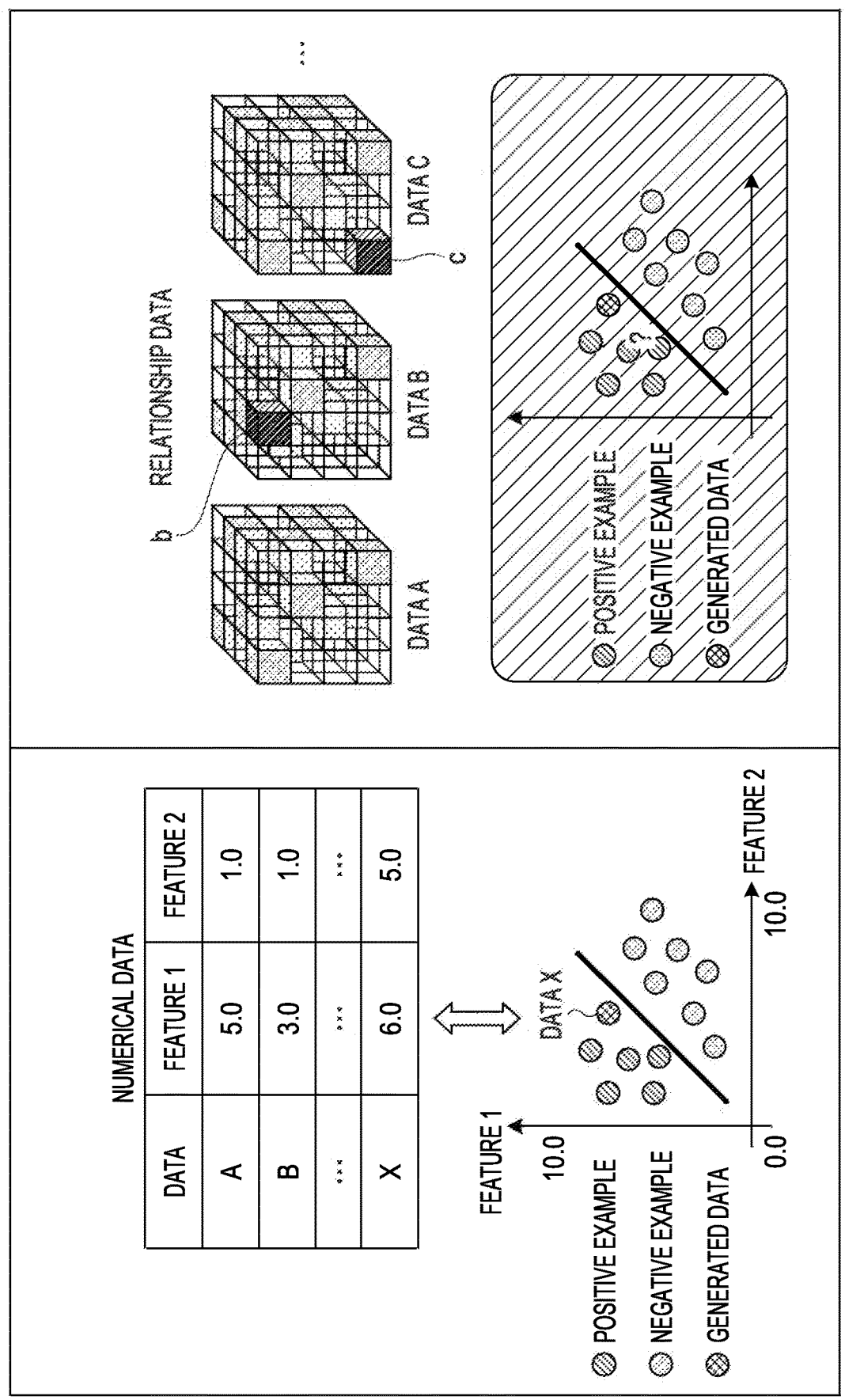
FIG. 3 is a diagram for describing problems of common data expansion.

However, in the relationship data as illustrated in FIG. 2, it is difficult to determine whether the expanded training data B or the expanded training data C is positive example training data or negative example training data. FIG. 3 is a diagram for describing a problem of common data expansion. As illustrated in FIG. 3, in a case where numerical data is configured of "data", "characteristic 1", and "characteristic 2", a positive example and a negative example may be easily determined by the distribution of each characteristic, so it is possible to easily determine which class data X that is newly generated by data expansion corresponds to. Thus, expanded training data of a positive example and expanded training data of a negative example may be easily generated.

On the other hand, in the case of relationship data, it is not possible to clarify how a modified or added tensor portion affects the class classification. For example, even in a case where expanded training data B obtained by changing a discrete value that is an element of the relationship data and expanded training data C obtained by adding a discrete value are generated, it is not clear how the deep tensor handles the discrete value or the combination of the discrete values, and therefore it is impossible to determine whether the respective expanded training data is a positive example or a negative example. As a result, an event may occur in which the expanded training data to be handled as a negative example is learned as positive example training data, or the like and learning accuracy may deteriorate.

The data expansion device 10 according to the first embodiment learns a deep tensor by using existing training data, and learns a linear model that approximates the obtained learning result. The data expansion device 10 identifies the important elements for classification by the deep tensor based on a regression coefficient obtained at this time, adds the combination of the identified elements to the original data, and generates expanded training data.

For example, as illustrated in FIG. 1, the data expansion device 10 executes learning of a deep tensor (DT), learning by a DT explanation function, and data expansion. First, the data expansion device 10 generates tensor data 32 from training data 31, and inputs the tensor data 32 to the DT. Next, the data expansion device 10 learns DT so that an error between the output value 34 of the DT and the label of the training data becomes small. Then, the data expansion device 10 learns a linear model 35 that locally approximates a predicted result of the learned DT.

After that, the data expansion device 10 uses the regression coefficient of the learned linear model 35 to identify a part contributing to the learning of the DT from the original tensor data 32. Then, when the core tensor is extracted at the time of learning the DT, the data expansion device 10 generates expanded training data 36 from the original tensor data 32 by using an element matrix to which the identified part is added.

In this way, the data expansion device 10 may identify the part contributing to the learning of the DT by using the learning result of the DT and the learning result of the linear model 35, and thus may generate expanded training data 36 that contributes to the learning of the DT.

[Functional Configuration of Data Expansion Device]

Figure 4:
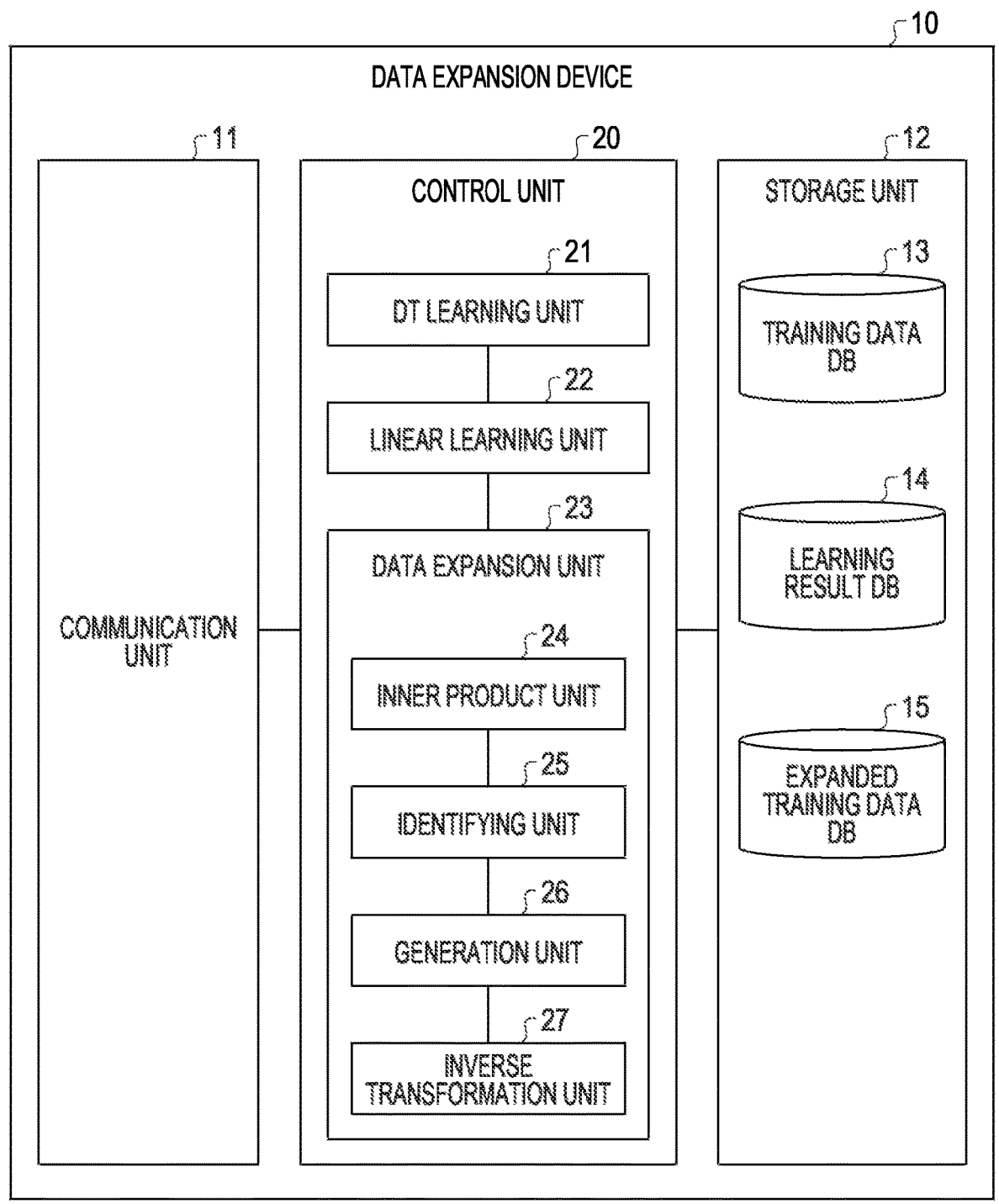
FIG. 4 is a functional block diagram illustrating a functional configuration of the data expansion device according to the first embodiment.

FIG. 4 is a functional block diagram illustrating a functional configuration of the data expansion device 10 according to this first embodiment. As illustrated in FIG. 4, the data expansion device 10 includes a communication unit 11, a storage unit 12, and a control unit 20.

The communication unit 11 is a processing unit that controls communications with other devices and, for example, is a communication interface or the like. For example, the communication unit 11 receives a processing start instruction, training data, and the like from a management device (not illustrated) used by an administrator, and transmits the result of learning, the result of data expansion, and the like to the management device.

The storage unit 12 is an example of a storage device that stores data and programs that are executed by the control unit 20, and, for example, is a memory, a hard disk, or the like. For example, the storage unit 12 stores a training data DB 13, a learning result DB 14, and an expanded training data DB 15.

The training data DB 13 is a database that stores training data, which is an example of training data (learning data) used for learning of deep learning using a deep tensor, and the learning of a DT explanation function using a linear model. For example, the training data DB 13 stores a plural pieces of training data in which a communication log and a label are correlated.

FIG. 5 is a diagram illustrating an example of information stored in the training data DB 13. As illustrated in FIG. 5, the training data DB 13 correlates and stores acquisition time 41, data 42, and label 43. The acquisition time 41 indicates the time when data 42 is acquired, and the data 42 indicates the data to be learned. The label 43 is correct answer information used for learning by a deep tensor, where "0" is set when indicating unauthorized communication, and "1.0" is set when indicating "normal communication".

The example in FIG. 5 indicates that data (communication log) acquired during the acquisition time "10:00 to 10:10" is normal communication (label=1.0). In the communication log, a communication source host 51 that indicates the IP address of the communication source, a communication destination host 52 that indicates the IP address of a client terminal that is the communication destination, and an amount 53 that indicates the generated communication amount are correlated with each other. For example, the communication log indicates that communication from the communication source host S1 to the communication destination host R1 has occurred three times.

Each record in the communication log corresponds to the relationship, the "a communication source host 51", "communication destination host 52", "an amount 53", and the like correspond to variables, "S1" and the like correspond to variable values which are to be inputted to the neural network.

The learning result DB 14 is a database for storing learning results by the control unit 20 described later. For example, the learning result DB 14 stores the classification result of the training data, the value of each parameter of the neural network (deep tensor) learned by deep learning, the learning result of the DT explanation function, and the like. In this way, the learning result DB 14 stores various types of information used to construct a learning model that has been learned.

The expanded training data DB 15 is a database that stores expanded training data generated by the control unit 20 described later. For example, the expanded training data DB 15 stores tensor data or the like corresponding to an abnormal communication log (negative example) such as an attack or the like generated by data expansion.

The control unit 20 is a processing unit responsible for the entire data expansion device 10 and is, for example, a processor or the like. The control unit 20 includes a DT learning unit 21, a linear learning unit 22, and a data expansion unit 23.

The DT learning unit 21 is a processing unit that performs neural network deep learning and tensor decomposition method learning on a learning model in which tensor data is tensor decomposed as input tensor data and inputted to a neural network. Thus, the DT learning unit 21 executes learning of a learning model using a deep tensor, with each tensor data and label generated from each training data as input. A three-dimensional tensor will be described as an example.

Figure 6:
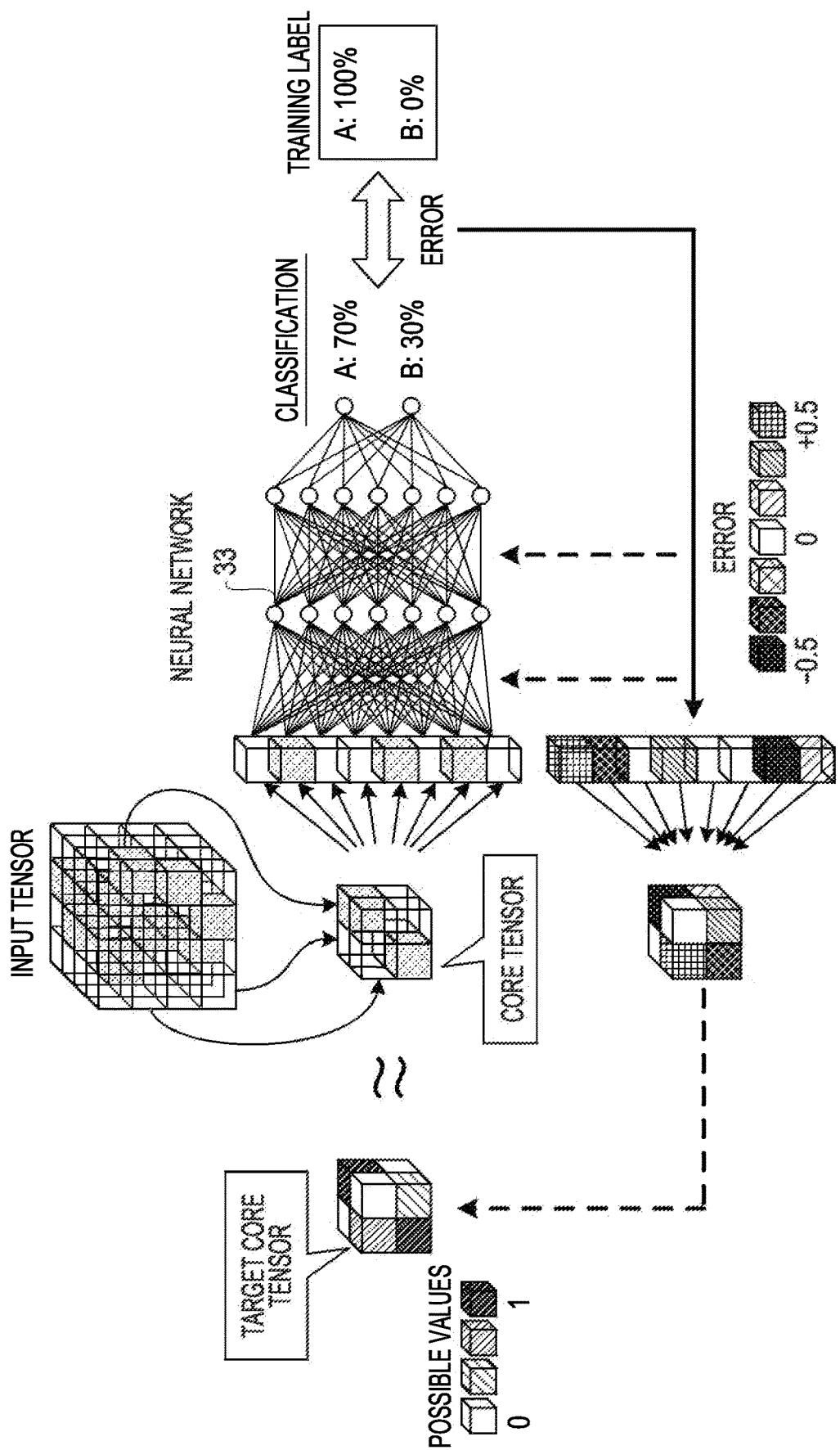
FIG. 6 is a diagram for describing a learning example by a deep tensor.

FIG. 6 is a diagram for describing a learning example by a deep tensor. As illustrated in FIG. 6, the DT learning unit 21 reads training data from the training data DB 13, and generates tensor data in which the graph structure of the training data is represented by a tensor representation. Then, the DT learning unit 21 performs tensor decomposition of the generated tensor data as an input tensor, and generates a core tensor so as to be similar to the target core tensor generated at random the first time. Then, the DT learning unit 21 inputs the core tensor to the neural network 33 and obtains a classification result (label A: 70%, label B: 30%). After that, the DT learning unit 21 calculates a classification error between the classification result (label A: 70%, label B: 30%) and the training label (label A: 100%, label B: 0%).

The DT learning unit 21 executes learning of the learning model by using an expanded error propagation method in which an error reverse propagation method is expanded. In this way, the DT learning unit 21 corrects various parameters in the neural network so as to reduce the classification error by propagating the classification error to the lower layer for the input layer, intermediate layer, and output layer in the neural network. The DT learning unit 21 propagates the classification error to the target core tensor and modifies the target core tensor so as to approach a characteristic pattern indicating a characteristic of a normal communication log or a characteristic pattern indicating a characteristic of an abnormal communication log, which is a partial graph structure that contributes to the prediction. In this way, the partial pattern that contributes to prediction is extracted from the optimized target core tensor.

Figure 7:
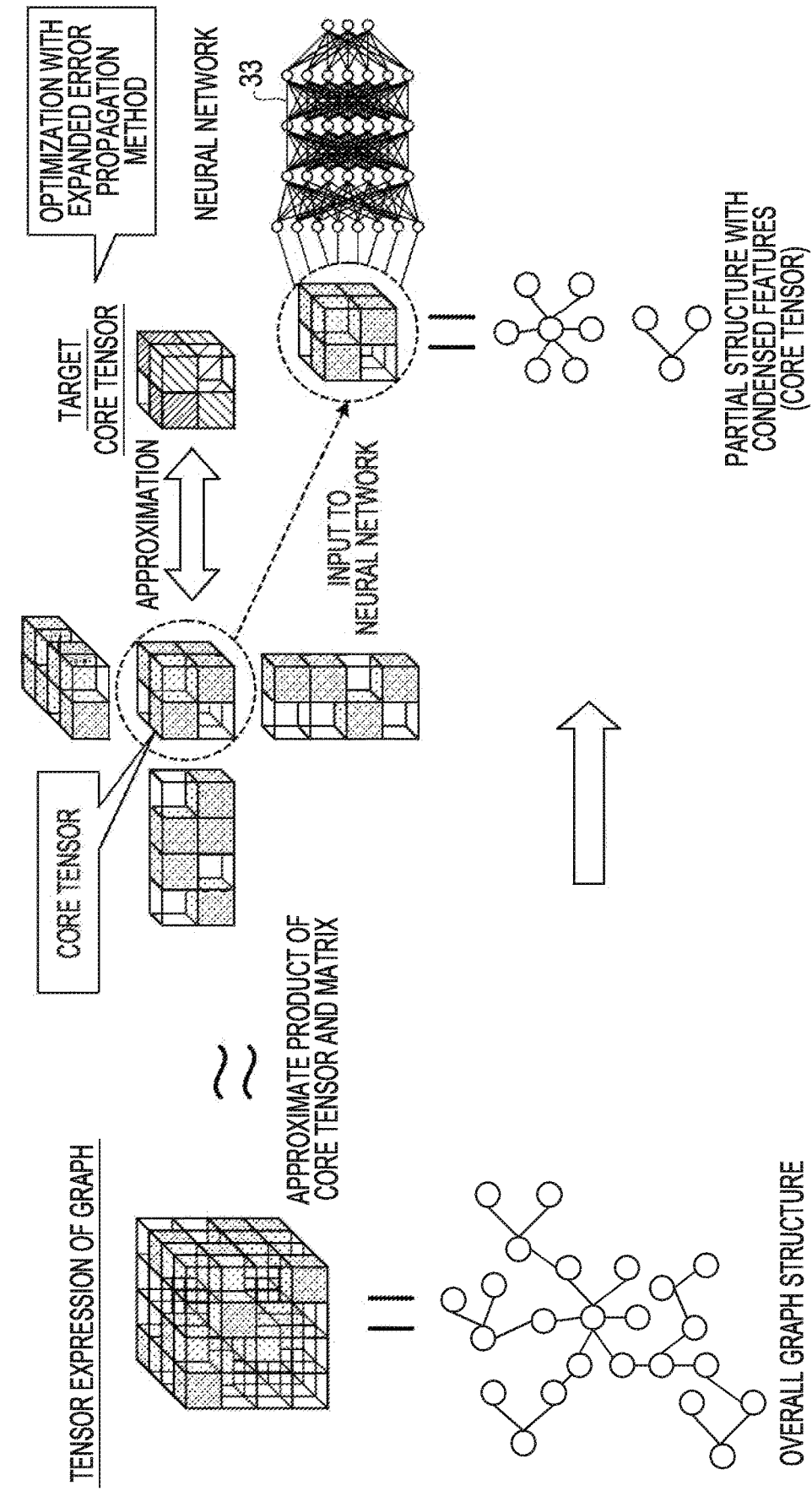
FIG. 7 is a diagram for describing the generation of a core tensor in a deep tensor.

FIG. 7 is a diagram for describing the generation of a core tensor in a deep tensor. As illustrated in FIG. 7, the DT learning unit 21 decomposes graph structure data into a core tensor and an element matrix by structure constraint tensor decomposition, and inputs the core tensor to the neural network 33. In the structure constraint tensor decomposition, the core tensor is calculated so that the characteristic amount important for the classification is as similar as possible to the reconstructed target core tensor. In this way, it is possible to arrange structures important for the classification at a similar position in the core tensor.

The structure constraint tensor decomposition executed by the DT learning unit 21 is calculated by 2-stage optimization. In the first stage, using the given target core tensor, only the element matrix is optimized so as to best approximate the input tensor data. In the second stage, using the element matrix optimized in the first stage, the core tensor is optimized to best approximate the input tensor data. The core tensor optimized in this way is inputted to the neural network 33.

Figure 8:
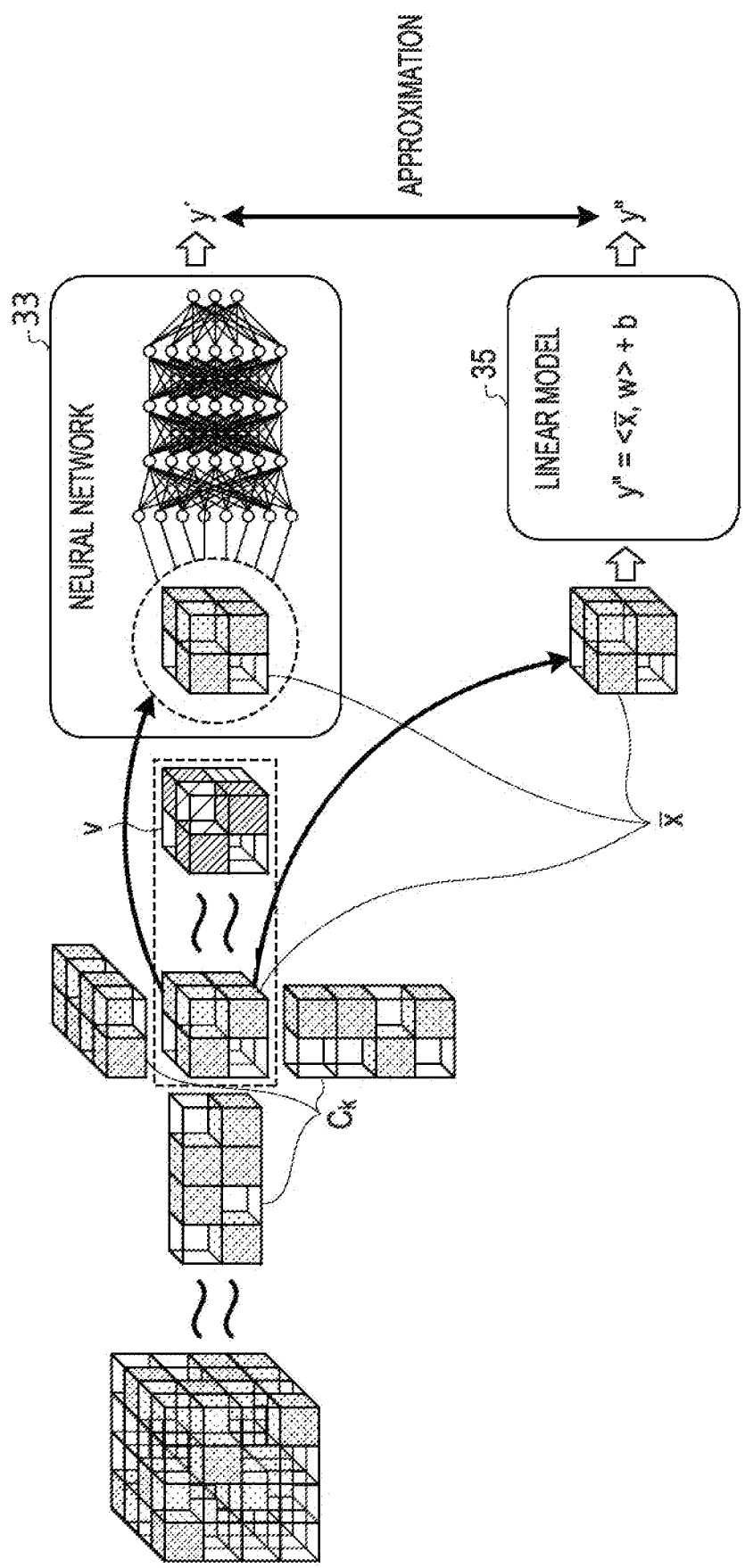
FIG. 8 is a diagram for describing learning of a linear model.

The linear learning unit 22 is a processing unit that learns a linear model that locally approximates a prediction result by a deep tensor. FIG. 8 is a diagram for describing learning of a linear model. As illustrated in FIG. 8, the linear learning unit 22 generates the core tensor $x^-$ (x bar) from the input data so as to approximate (be similar to) the target core tensor v by using the optimized element matrix $C_k$ in each dimension. Then, the linear learning unit 22 inputs the core tensor $x^-$ to the neural network 33 to acquire the output result y', and also inputs the core tensor $x^-$ to the linear model 35 to acquire the output result y".

After that, the linear learning unit 22 learns the linear model 35 so that the output result y' by the neural network 33 approximates the output result y" by the linear model 35. In this way, the linear learning unit 22 learns the linear model 35, and calculates the regression coefficient for each dimension. Thus, the linear learning unit 22 calculates a regression coefficient corresponding to the element matrix in each dimension. In the linear model 35, w is a weight of each dimension, and b is a constant.

Figure 9:
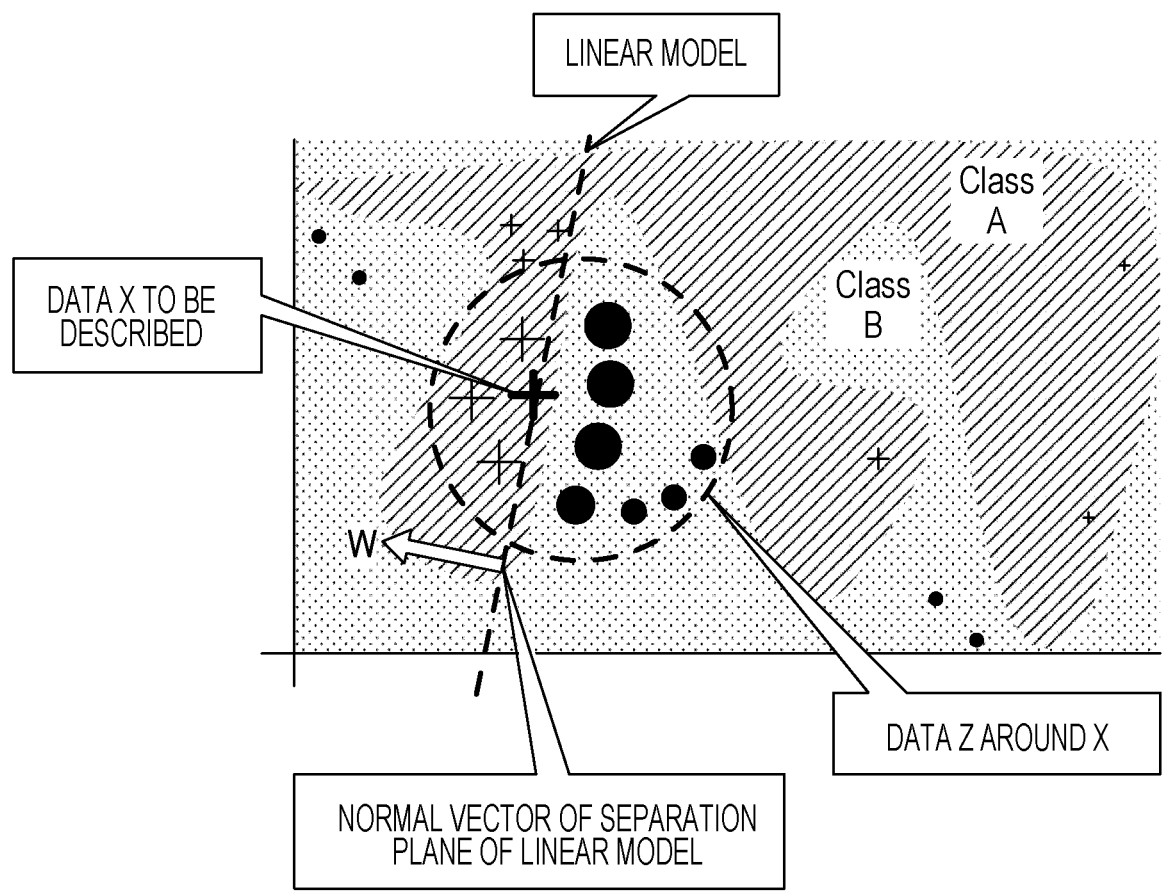
FIG. 9 is a diagram for describing a learned linear model.

FIG. 9 is a diagram for describing a learned linear model. As illustrated in FIG. 9, the learned linear model realizes classification explanation of data for an any range in a neural network that is classified into class A and class B. For example, the learned linear model indicates to which class data x is classified by defining a normal vector w of the separation plane for peripheral data z of the data x to be described.

Referring back to FIG. 4, the data expansion unit 23 is a processing unit that includes an inner product unit 24, an identifying unit 25, a generation unit 26, and an inverse transformation unit 27, and executes data expansion.

The inner product unit 24 is a processing unit that calculates a score indicating a contribution degree (importance) in classification, which is obtained from an inner product of a regression coefficient obtained from a linear model and an element matrix. For example, the inner product unit 24 selects training data that will be a reference. For example, the inner product unit 24 selects training data to which a label that is an abnormal communication log is given when the classification probability by the deep tensor is about 50%. Then, the inner product unit 24 extracts the core tensor ($x^-$) of the selected training data using the learned linear model, the deep tensor, and the like.

Figure 10:
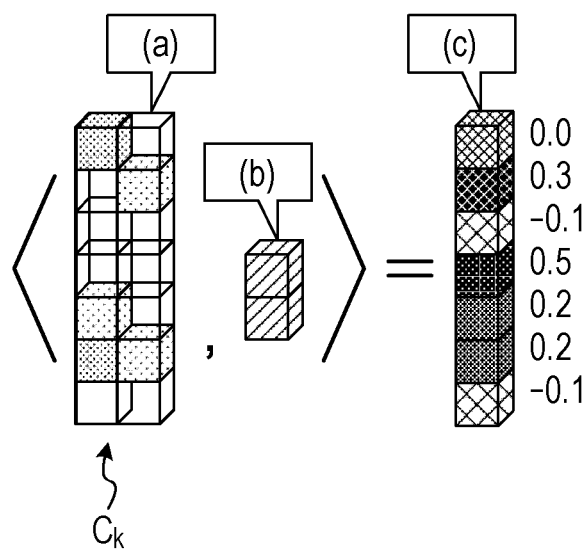
FIG. 10 is a diagram for describing an inner product process.

After that, the inner product unit 24 calculates the inner product of the row vector of the element matrix and the column vector of the regression coefficient for each dimension, and acquires a score. FIG. 10 is a diagram for describing an inner product process. As illustrated in FIG. 10, the inner product unit 24 calculates an inner product of the k-dimensional element matrix $C_k$ (refer to (a)) optimized by the learning by the DT learning unit 21 and the k-dimensional regression coefficient (refer to (b)) obtained from the learned linear model, thereby calculating a k-dimensional score (refer to (c)). Then, the inner product unit 24 outputs the calculation result, the extracted core tensor, and the like to the identifying unit 25.

The learned k-dimensional element matrix $C_k$ is a matrix including elements other than the input. Thus, the element matrix $C_k$ is a matrix of a maximum range that may be inputted, and the shaded portions are elements to be actually inputted. In the example in FIG. 10, an example of a maximum of 6 elements is illustrated.

Figure 11:
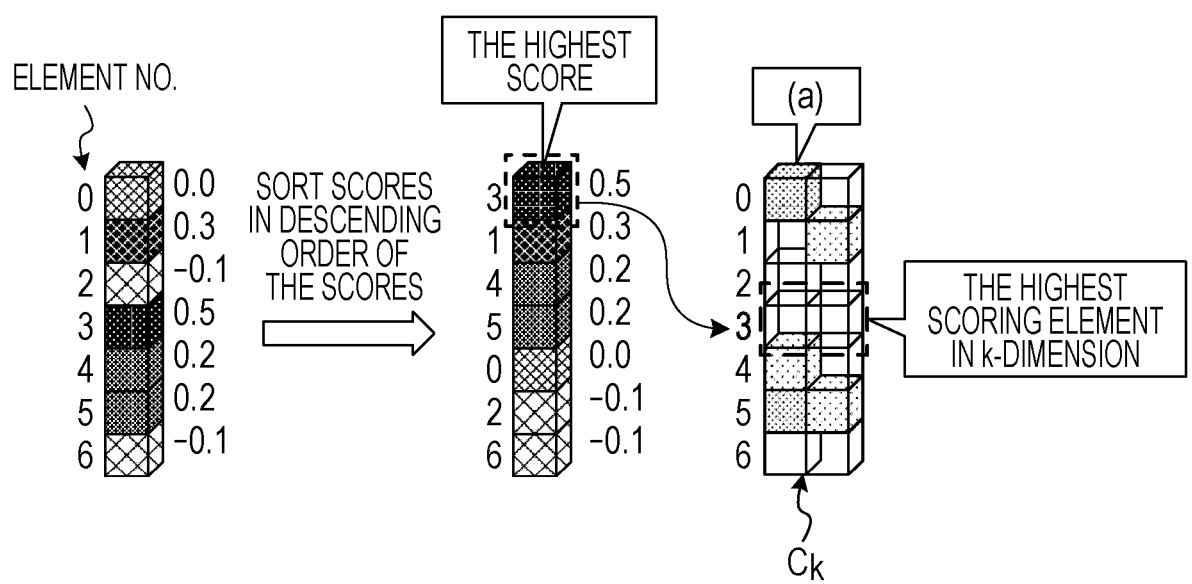
FIG. 11 is a diagram for describing an identifying process.

The identifying unit 25 is a processing unit that identifies an element that contributes in the largest degree to the classification. For example, the identifying unit 25 identifies an element having the highest score from among the scores calculated for each dimension, and outputs the element to the generation unit 26. FIG. 11 is a diagram for describing an identifying process. As illustrated in FIG. 11, the identifying unit 25 sorts the scores of the k-dimension acquired from the inner product unit 24 in descending order of the scores. The identifying unit 25 identifies the element 3 having the largest score of 0.5. This element 3 is the element of the highest score in the k-dimension. In this way, the identifying unit 25 identifies the element having the highest score for each dimension.

Figure 12:
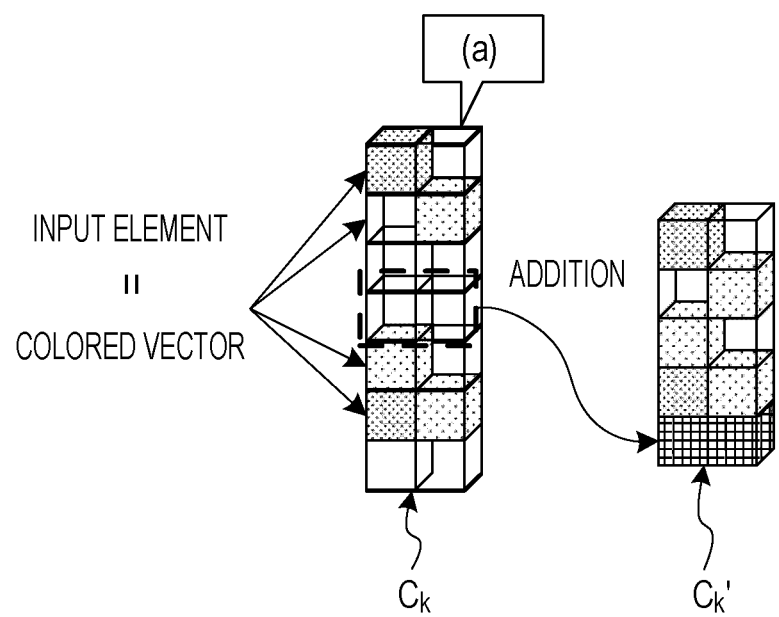
FIG. 12 is a diagram for describing an element matrix generating process.

The generation unit 26 is a processing unit that adds an element identified by the identifying unit 25 to the input element, and generates a new element matrix. FIG. 12 is a diagram for describing an element matrix generating process. As illustrated in FIG. 12, the generation unit 26 generates the element matrix $C_k'$ extracted so as to include the original input elements and the highest score element (element 3), of the k-dimensional element matrix $C_k$ (refer to (a)) which is the largest possible range that may be inputted. Then, the generation unit 26 outputs the new element matrix $C_k$ generated for each dimension to the inverse transformation unit 27.

Figure 13:
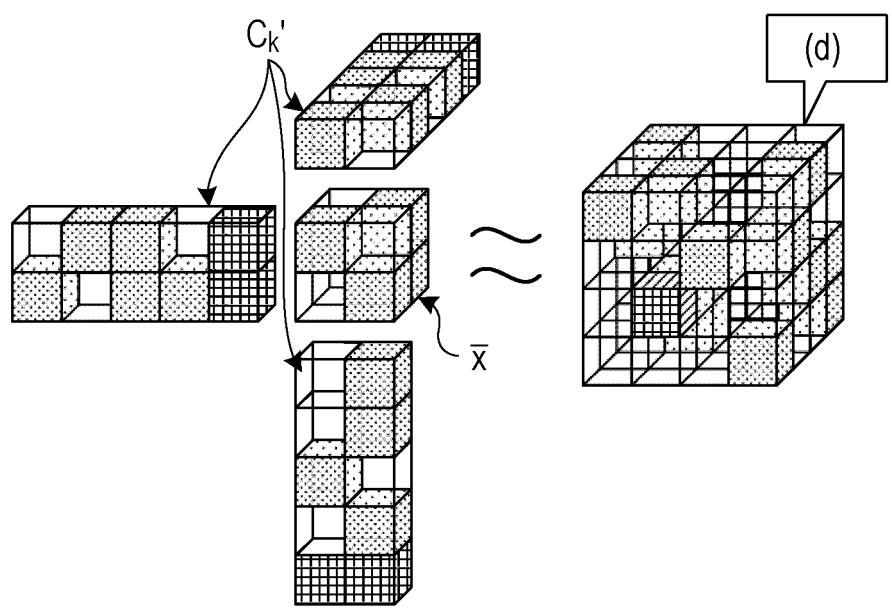
FIG. 13 is a diagram for describing an inverse transformation process.

The inverse transformation unit 27 is a processing unit that performs inverse transformation to an input tensor using the new element matrix of each dimension generated by the generation unit 26. FIG. 13 is a diagram for describing an inverse transformation process. As illustrated in FIG. 13, the inverse transformation unit 27 executes inverse transformation by applying a new element matrix $C_k'$ of each dimension to the core tensor ($x^-$) of the reference data, thereby generating tensor data. Then, the inverse transformation unit 27 generates expanded training data (refer to (d)) in which the obtained tensor data is associated with the same label as the reference data, and stores the expanded training data in the expanded training data DB 15.

[Process Flow]

Next, the flow of the data expansion process will be described. In the data expansion described above, the process of adding elements of the highest score among the scores for each dimension has been described. However, in order to improve the accuracy of the expanded training data, it is preferable to expand up to the edge and perform element addition determination.

The details of the data expansion process of data expanded to the edge will be described. When describing the dimension and edge of the training data illustrated in FIG. 5 as an example, the dimension corresponds to a column, and the edge corresponds to a row.

Figure 14:
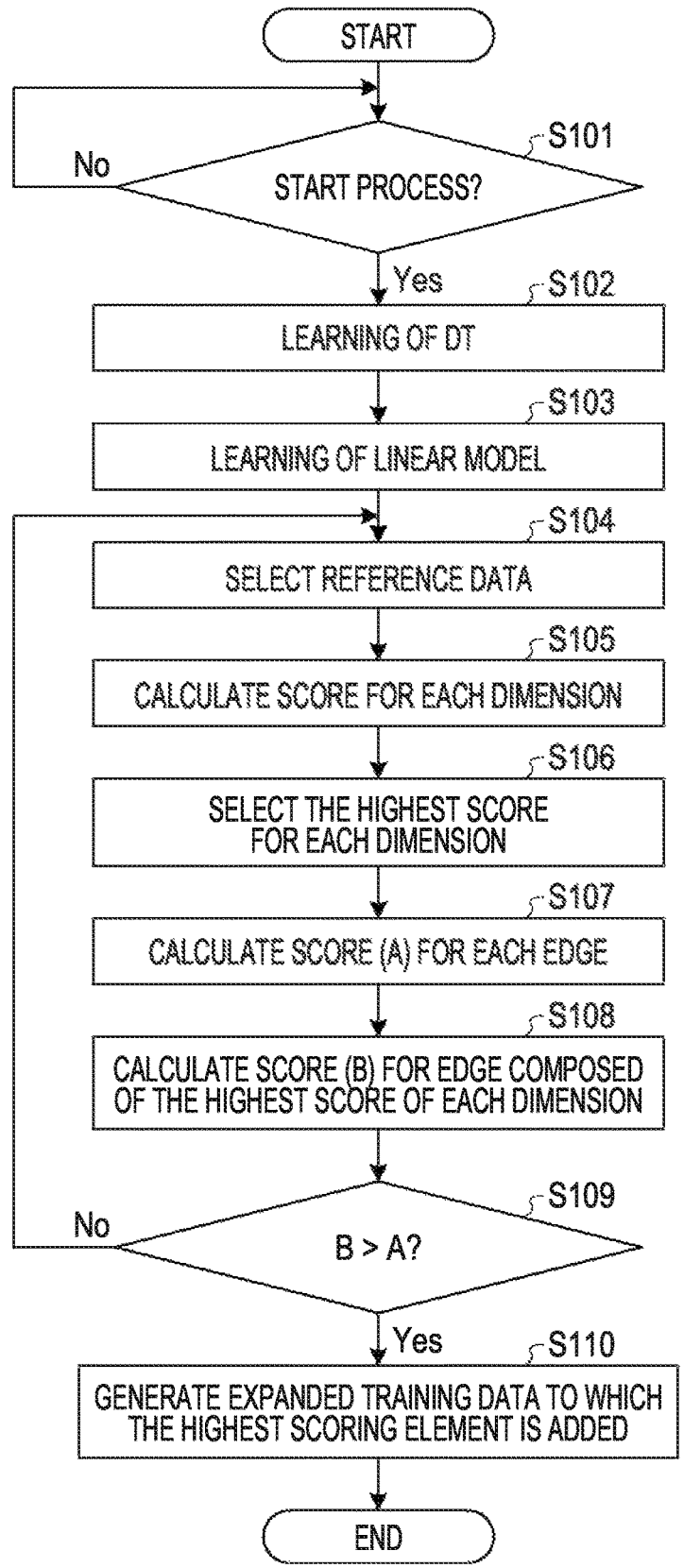
FIG. 14 is a flowchart illustrating flow of the data expansion process according to the first embodiment.

FIG. 14 is a flowchart illustrating flow of a data expansion process according to the first embodiment. As illustrated in FIG. 14, when there is an instruction to start the process (S101: Yes), the DT learning unit 21 executes learning by the deep tensor using the training data to construct a learning model (S102). The linear learning unit 22 learns the linear model by using the output result of the deep tensor to which the training data is inputted (S103).

When the learning is completed, the data expansion unit 23 selects the data that will be a reference (reference data) (S104). Next, the data expansion unit 23 calculates a score for each dimension by calculating for each dimension the inner product of the row vector of the element matrix optimized by DT learning and the column vector of the regression coefficient obtained from the learned linear model (S105). Then, the data expansion unit 23 selects the highest score of each dimension from the calculation result of the scores for each dimension (S106).

After that, the data expansion unit 23 calculates the score (A) for each edge by calculating for each edge the inner product of the column vector of the element matrix optimized by DT learning and the column vector of the regression coefficient obtained from the learned linear model (S107).

Then, the data expansion unit 23 calculates the score (B) for the edge composed of the highest score selected in S106 in the same manner as described above (S108).

In a case where the score (A) calculated in S107 is larger than the score (B) calculated in S108 (S109: No), the data expansion unit 23 returns to S104 and repeats the selection of the reference data.

On the other hand, when the score (B) calculated in S108 is larger than the score (A) calculated in S107 (S109: Yes), the data expansion unit 23 generates the expanded training data by inverse transformation using the element matrix to which the element having the highest score is added (S110).

[Effects]

Figure 15:
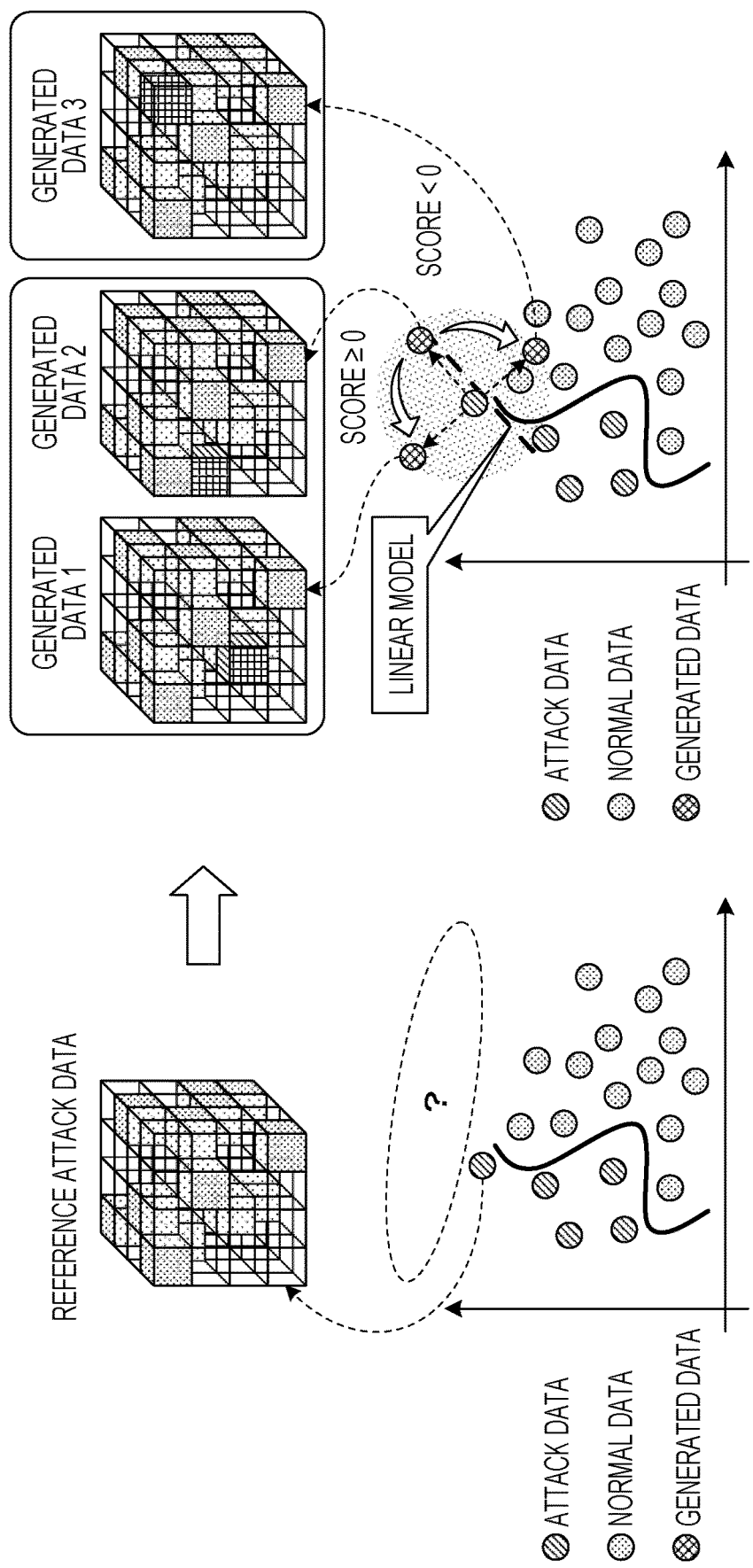
FIG. 15 is a diagram for describing data selection according to a score.

As described above, the data expansion device 10 is able to generate the attack varieties data by adding an element to the reference data so as to have a positive score, and thus is able to generate expanded training data that will contribute to learning by the deep tensor. FIG. 15 is a diagram for describing data selection according to a score. As illustrated in FIG. 15, adding an element having a score of 0 or more to a reference attack data generates same class (attack) data as the reference attack data.

Adding an element corresponding to a score having a maximum value of 0 or more adds data that is the same class as the reference attack data and that is the farthest from the linear model. In this way, it is possible to generate training data of which there is a high possibility of not being covered by the existing training data. On the other hand, adding an element having a score of less than 0 to the reference attack data generates data opposite class (normal) of the reference attack data.

Thus, in the data expansion according to the first embodiment, it is possible to generate new training data not included in the existing training data by generating expanded training data to which the element having the largest score is added. In a case where generating plural pieces of expanded training data is required, each expanded training data to which a respective element having a score of 0 or more is added may be generated.

Specific Example

Figure 16:
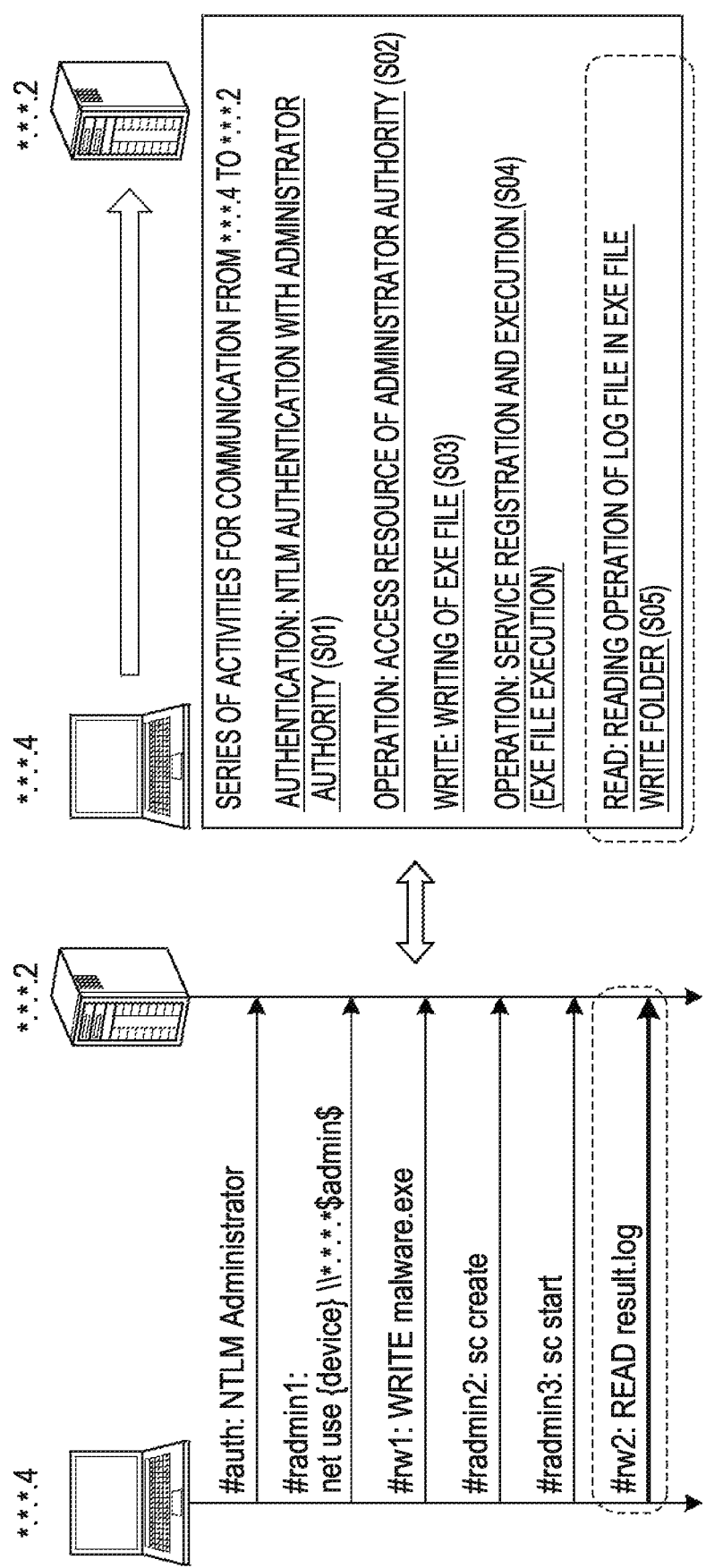
FIG. 16 is a diagram for describing a specific example.

FIG. 16 is a diagram describing a specific example. In FIG. 16, a specific example of the expanded training data added by the data expansion process will be described. FIG. 16 illustrates a series of activities for communication from a terminal (*.*.*.4) to a server (*.*.*.2).

For example, an authentication process is performed from the terminal to the server by administrator authority (S01), and access to the resources by the administrator authority is executed from the terminal to the server (S02). After that, after an exe file is written to the server from the terminal (S03), the exe file written to the server is executed by the terminal (S04).

In this way, by using a series of communication logs of unauthorized communication (attack) from the terminal to the server training data, it is possible to learn the characteristics of an attack that is performed for unauthorized information collection. Moreover, by the data expansion according to the first embodiment, "the reading operation of the log file in the exe file write folder" (S05) not included in the communication log may be added to the training data. As a result, in addition to the learning of characteristics of unauthorized information collection using only the communication log, the learning of characteristics of intelligence activity such as the unauthorized acquisition of data or the like may also be executed.

Second Embodiment

Although an embodiment of the technique according to the present disclosure has been described so far, the technique may be implemented in various different forms other than the embodiment described above.

[Data Numerical Values, and the Like]

The number of dimensions, tensor configuration examples, numerical values, data examples, label setting values, and the like used in the embodiment described above are merely examples, and may be optionally changed. A communication log is exemplified as an example of the training data, however, other data may also be used. For example, the above embodiment may also be applied to relationship data such as a transfer history having a transfer source, a transfer destination, a transfer count, and the like. The training data to be expanded may be either a positive example or a negative example. In the selection of the reference data, the training data having the smallest classification probability of classification probabilities of 50% or more, and for which a label to be expanded is set, may be selected.

[Re-Learning]

The data expansion device 10 may execute re-learning of a deep tensor or re-learning of a linear model by using the expanded training data. As a result, the classification accuracy of the deep tensor may be improved, and the accuracy of the linear model may also be improved.

[Learning Method]

The learning by the deep tensor and the learning by the linear model described in the embodiment above are not limited to those illustrated, and a publicly known method may also be used.

[System]

Processing procedures, control procedures, specific names, information including various kinds of data and parameters represented in the documents or drawings may be arbitrarily changed unless otherwise specified.

Each component of each device illustrated in the drawings is functionally conceptual, and is not necessarily physically configured as illustrated in the drawings. Thus, the specific forms of distribution or integration of each device is not limited to those illustrated in the drawings. Consequently, all or a part of the forms may be configured to be functionally or physically distributed or integrated into any units according to various loads, usage conditions, or the like. For example, each process may be implemented in separate devices, such as an apparatus for learning a deep tensor, an apparatus for learning a linear model, an apparatus for performing data expansion, and the like.

All or a part of each processing function performed in each device may be realized by a CPU and a program that is analyzed and executed by the CPU, or may be realized as hardware by wired logic.

[Hardware]

Figure 17:
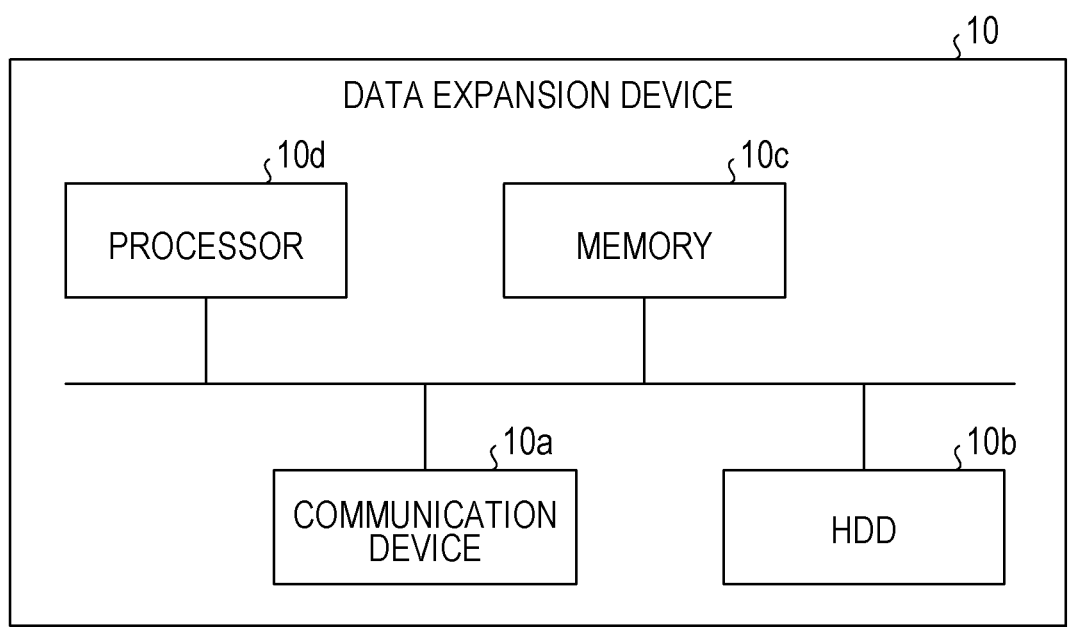
FIG. 17 is a diagram for describing an example of a hardware configuration.

FIG. 17 is a diagram describing an example of a hardware configuration. As illustrated in FIG. 17, the data expansion device 10 includes a communication device 10a, a hard disk drive (HDD) 10b, a memory 10c, and a processor 10d. The units illustrated in FIG. 17 are coupled to each other via a bus or the like.

The communication device 10a is a network interface card or the like, and performs communication with other servers. The HDD 10b stores programs or a DB for operating the functions illustrated in FIG. 4.

By reading a program from the HDD 10b or the like for executing the same processes as each processing unit illustrated in FIG. 4 and loading the program in the memory 10c, the processor 10d operates a process for executing each of the functions described in FIG. 4 and the like. Thus, this process performs substantially the same functions as the processing units included in the data expansion device 10. For example, the processor 10d reads a program having the same functions as those of the DT learning unit 21, the linear learning unit 22, the data expansion unit 23, and the like from the HDD 10b or the like. In addition, the processor 10d executes a process for executing processes similar to that performed by the DT learning unit 21, the linear learning unit 22, the data expansion unit 23, and the like.

In this way, the data expansion device 10 operates as an information processing device that executes a data expansion method by reading and executing a program. In addition, the data expansion device 10 may realize the same function as in the embodiment described above by reading the program from a recording medium by a medium reading device, and by executing the read program. The program referred in this other embodiment is not limited to being executed by the data expansion device 10. For example, the present embodiment may be similarly applied to a case where another computer or server executes the program, or a case where these cooperate to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a data expansion program for causing a computer to execute a process comprising:
   identifying partial tensor data that contributes to machine learning using first tensor data in a tensor format obtained by transforming first training data having a graph structure; and
   based on the partial tensor data and the first training data, generating expanded training data to be used in the machine learning by expanding the first training data.

2. The non-transitory, computer-readable recording medium of claim 1, wherein:
   the machine learning is learning for inputting tensor data using a neural network; and
   the identifying includes identifying the partial tensor data from a first element matrix for each of dimensions, the first element matrix being used for generating a core tensor from training data and being optimized during the machine learning.

3. The non-transitory, computer-readable recording medium of claim 2, the process further comprising:
   learning a linear model that locally approximates an output result of the neural network by using the core tensor, wherein
   the identifying includes:
   calculating inner products of respective element matrices of the dimensions and respective regression coefficients of the dimensions, each of the regression coefficients being obtained from the linear model, and
   identifying a first element for each of the dimensions as the partial tensor data, the first element corresponding to an inner product having a largest value.

4. The non-transitory, computer-readable recording medium of claim 3, wherein
   the generating includes:
   generating a second element matrix for each of the dimensions, the second element matrix being obtained by adding the first element to each of the first element matrixes, and
   generating second tensor data corresponding to the expanded training data by inverse transformation that uses the second element matrix for each of the dimensions and the core tensor extracted from second training data that is an expansion reference.

5. The non-transitory, computer-readable recording medium of claim 4, wherein
   the generating includes selecting, as the second training data, training data in which a classification probability that is an output result of the neural network is less than a threshold and for which a label for expansion is set.

6. The non-transitory, computer-readable recording medium of claim 2, the process further comprising:
   executing re-learning of the learned neural network by using the generated expanded training data.

7. A method performed by a computer, the method comprising:
   identifying partial tensor data that contributes to machine learning using tensor data in a tensor format obtained by transforming training data having a graph structure; and
   based on the partial tensor data and the training data, generating expanded training data to be used in the machine learning by expanding the training data.

8. An apparatus comprising:
   a memory; and
   a processor coupled to the memory and configured to:
   identify partial tensor data that contributes to machine learning using tensor data in a tensor format obtained by transforming training data having a graph structure, and
   based on the partial tensor data and the training data, generate expanded training data by expanding the first training data to be used in the machine learning.

* * * * *